(12) United States Patent
Duderstadt (10) Patent No.: US 8,678,457 B1
(45) Date of Patent: Mar. 25, 2014

(54) TELESCOPING GRAB HANDLE FOR PICKUP TRUCKS AND THE LIKE

(76) Inventor: James Louis Duderstadt, San Antonio, TX (US)

( * ) Notice: Subject to any disclaimer, the term of this patent is extended or adjusted under 35 U.S.C. 154(b) by 0 days.

(21) Appl. No.: 13/608,805

(22) Filed: Sep. 10, 2012

Related U.S. Application Data (60) Provisional application No. 61/533,235, filed on Sep. 11, 2011.

(51) Int. Cl.
*B60R 99/00* (2009.01)

(52) U.S. Cl.
USPC .............................. 296/1.02; 16/429

(58) Field of Classification Search
USPC ............... 296/1.02, 57.1, 183.1; 16/429
See application file for complete search history.

(56) References Cited

U.S. PATENT DOCUMENTS

| | | | |
|---|---|---|---|
| 1,099,924 A | 6/1914 | Johnson | |
| 1,691,639 A | 11/1928 | Charlebois et al. | |
| 3,858,905 A | 1/1975 | Peebles | |
| 5,028,063 A | 7/1991 | Andrews | |
| 5,046,582 A | 9/1991 | Albrecht | |
| 5,205,603 A | 4/1993 | Burdette, Jr. | |
| 5,687,813 A | 11/1997 | Bensch | |
| 6,003,633 A | 12/1999 | Rolson | |
| 6,116,378 A | 9/2000 | Barrow | |
| 6,425,572 B1 | 7/2002 | Lehr | |
| 6,578,666 B1 | 6/2003 | Miller | |
| 6,640,929 B2 | 11/2003 | Korpi | |
| 6,643,897 B2 | 11/2003 | Chang | |
| 6,715,813 B2 | 4/2004 | Thompson et al. | |
| 6,739,639 B1 | 5/2004 | Chumley et al. | |
| 6,942,271 B1 | 9/2005 | Jamison et al. | |
| 6,964,444 B2 | 11/2005 | Chumley et al. | |
| 6,994,362 B2 | 2/2006 | Foster | |
| 7,025,174 B1 | 4/2006 | Hawley | |
| 7,055,838 B2 | 6/2006 | Lambie | |
| 7,080,713 B1 | 7/2006 | Riggs | |
| 7,090,276 B1 | 8/2006 | Bruford et al. | |
| 7,111,858 B2 | 9/2006 | Manser et al. | |
| 7,229,116 B1 | 6/2007 | Bruford et al. | |
| 7,240,947 B2 | 7/2007 | Kuznarik et al. | |
| 7,347,473 B2 | 3/2008 | Miller et al. | |
| 7,401,798 B2 | 7/2008 | Dolan | |
| 7,438,304 B2 | 10/2008 | Segall | |
| 7,441,820 B1 | 10/2008 | Alvarado | |
| D585,350 S | 1/2009 | Coletti | |
| 7,472,938 B2 | 1/2009 | Firzlaff et al. | |
| 7,488,021 B1 | 2/2009 | Roos et al. | |
| 7,516,997 B2 | 4/2009 | Kuznarik et al. | |
| 7,530,619 B1 | 5/2009 | Bruford et al. | |

(Continued)

*Primary Examiner* — Jason S Morrow
(74) *Attorney, Agent, or Firm* — Kammer Browning PLLC (57) ABSTRACT

A telescoping grab handle mounted on the side wall of the cargo box, adjacent the tailgate, in a pickup truck. The device has only one moving part which allows the telescoping grab handle to be easily raised vertically and locked into the extended position or easily lowered to the retracted or stowed position while standing on the ground outside the cargo box. The telescoping grab handle mounted on the side wall of the cargo box also overcomes many disadvantages of tailgate mounted grab handles which interfere with cargo handling and are rendered inoperable if the tailgate is damaged. The telescoping grab handle mounted on the side wall of the cargo box may be added as an aftermarket accessory, but the internal components of the device could also be incorporated directly into the side wall of the cargo box by the auto manufacturer during initial manufacture of the vehicle.

19 Claims, 6 Drawing Sheets

(56) References Cited

U.S. PATENT DOCUMENTS

| | | |
|---|---|---|
| 7,617,571 B2 | 11/2009 | Lee et al. |
| 7,673,922 B1 | 3/2010 | Grimes |
| 7,712,811 B2 | 5/2010 | Heaman et al. |
| 7,744,141 B2 | 6/2010 | Saionji et al. |
| 7,954,836 B2 | 6/2011 | Mann |
| 8,075,008 B1 | 12/2011 | Hanser et al. |
| 8,182,013 B1 | 5/2012 | Alvarado |
| 8,251,423 B1 | 8/2012 | Lingle |
| 8,393,657 B1 * | 3/2013 | Duderstadt ............ 293/117 |
| 2003/0201656 A1 * | 10/2003 | Ferguson et al. ............ 296/3 |
| 2007/0096422 A1 * | 5/2007 | Dolan ............ 280/163 |
| 2009/0322052 A1 | 12/2009 | Ruehl |
| 2010/0230209 A1 | 9/2010 | Hughes et al. |
| 2011/0168491 A1 | 7/2011 | Cheatham, Jr. |
| 2012/0104721 A1 | 5/2012 | Genest et al. |

* cited by examiner

Fig. 6 (View A-A')

Fig. 7 (View B-B')

Fig. 8

Fig. 9 (View C-C')

Fig. 10 (View D-D')

Fig. 11

Fig. 12 (View E-E')

Fig. 13 (View F-F')

Fig. 14

Fig. 15 (View G-G')

Fig. 16 (View H-H')

TELESCOPING GRAB HANDLE FOR PICKUP TRUCKS AND THE LIKE

CROSS REFERENCES TO RELATED APPLICATIONS

This application claims the benefit under Title 35 United States Code §119(e) of U.S. Provisional Application 61/533,235 filed Sep. 11, 2011, the full disclosure of which is incorporated herein by reference.

BACKGROUND OF THE INVENTION

1. Field of the Invention

The present invention relates generally to systems for increasing ease of access into cargo areas present on motorized vehicles including pickup trucks in some embodiments.

2. Description of the Related Art

Various types of motorized vehicles feature a cargo area, including pickup trucks having a cargo box. The cargo box (or cargo bed as it is sometimes called) is generally comprised of a floor bounded by a front wall, two side walls and an operable tailgate in the rear. The tailgates on most pickup trucks generally open to a horizontal position to allow easy access for the loading or unloading of cargo and close to a vertical position to retain the cargo within the cargo box.

Most pickup trucks are now manufactured without exterior running boards along the sides of the cargo box. Consequently, access into and out of the cargo box is typically accomplished by stepping on top of the rear bumper or on top of the tailgate when it is open or in the horizontal position. However, recent trends in pickup truck design have raised the level of the rear bumper and the tailgate to such a height above the ground that it is now difficult to enter & exit the cargo box of most pickup trucks. This is particularly true of four wheel drive models which often have larger tires and higher ground clearance than other models.

Many schemes involving grab handles have been developed to provide enhanced stability to personnel as they enter and exit the cargo box of a pickup truck. However, most of the grab handles presented in the prior art are mounted on the tailgate and often create an obstruction when loading or unloading cargo. For example, the pivoting grab handle shown in U.S. Pat. No. 7,530,619 could not be utilized when loading or unloading standard size sheets of plywood or other large bulky objects over the tailgate, because it would create an obstruction. Furthermore, grab handles mounted on the tailgate cannot be utilized when the tailgate is closed and they are often rendered inoperable if the tailgate is damaged.

U.S. Pat. No. 7,401,798 shows a grab handle mounted to the side wall of the cargo box, but it is pivotally attached at the bottom and must be folded down onto the bed of the cargo box to be placed in the stowed position. Furthermore, this particular grab handle is connected to the tailgate by a cable which is meant to raise the grab handle as the tailgate is opened (or lowered) to the horizontal position, thereby making it difficult or impossible to open the tailgate if any cargo was laid on top or against this grab handle. Consequently, any cargo resting on top or against this particular grab handle would have to be cleared away while standing on the ground outside the cargo box, before the tailgate could be opened and the grab handle could be utilized to enter the cargo box.

US Patent Application Publication No. 2012/0104721 A1 shows a telescoping grab handle pivotally attached to a tailgate step. The telescoping portion thereof utilizes an internal spring pin (item 88) to lock the grab handle in the extended position. Such spring pins are well know in the art and are commonly utilized to adjust the height of walking canes and crutches, but only on an occasional basis to suit the needs of the individual using the device. However, utilizing a spring pin device on a routine basis would be awkward and cumbersome because two free hands are usually required to adjust telescoping devices which operate with a spring pin. One hand is required to depress the spring pin, while the other hand is required to slide the telescoping member. Furthermore, this grab handle is mounted on the tailgate and would also be subject to the aforementioned disadvantages.

Thus, there is a dire need in the automotive market to provide a grab handle which will not interfere with cargo handling, yet still provide assistance and enhanced stability to personnel when entering or exiting the cargo box of a pickup truck. In addition, the grab handle must be simple to use, durable and maintenance free with a minimum of moving parts, inexpensive to manufacture and easy to install on a wide variety of pickup trucks.

SUMMARY OF THE INVENTION

It is the object of the proposed embodiment to overcome the aforementioned disadvantages by providing a telescoping grab handle which is mounted on the side wall of the cargo box, adjacent the tailgate.

Unlike grab handles mounted on the tailgate, the proposed embodiment would never interfere with the loading or the unloading of cargo because the proposed telescoping grab handle would be mounted on the side wall of the cargo box, not on the tailgate.

In addition, the proposed embodiment would not interfere with stowed cargo because the proposed grab handle would telescope up or down vertically and thereby occupy a very small area within the cargo box, unlike a pivoting grab handle which folds up or down and would thereby require a large cleared area in the cargo box (at least as long as the grab handle) in order to remain operable.

The telescoping action of the proposed embodiment has only one moving part which allows the grab handle to be easily extended or retracted with only one hand, unlike telescoping grab handles which have a spring pin and therefore two moving parts (the spring pin and the telescoping member) which require two hands to extend or retract the grab handle.

Unlike grab handles which are mounted on the tailgate and can only be used when the tailgate is open (or in the horizontal position), the proposed telescoping grab handle is mounted on the side wall of the cargo box and can be utilized when entering or exiting the cargo box regardless of whether the tailgate is open or closed.

The proposed embodiment for a telescoping grab handle mounted on the side wall would also remain operable even if the tailgate was damaged or completely removed.

For the aforementioned reasons, the chosen location for a grab handle placed within the cargo box of a pickup truck and the type of action utilized for extending or retracting the grab handle is critically important to its successful use and operation.

The preferred embodiment described herein for a telescoping grab handle mounted on the side wall of the cargo box would most likely be added after initial manufacture of the pickup truck as an aftermarket accessory, however another embodiment of the invention might also be incorporated directly into the side wall of the pickup truck by the auto manufacturer during initial manufacture of the vehicle.

The main components of the preferred embodiment for a telescoping grab handle mounted on the side wall of the cargo box of a pickup truck are briefly described below. The only moving component of the preferred embodiment is an elongated round bar (or elongated round tube) which is sized so that it will rotate and slide within a square tube. The square tube is attached to a mounting bracket and the axis is oriented vertically when attached to the side wall of the cargo box, thus the square tube will hold the elongated round bar in a vertical upright position, yet will also allow the elongated round bar to rotate and slide up or down vertically.

A small bar herein called the "lock pin" is placed perpendicularly thru the elongated round bar and is permanently fixed into the elongated round bar so that it slightly protrudes on each side. The length of the lock pin is sized so that it will fit diagonally within the square tube, thus the lock pin will support the elongated round bar in the extended or raised position when the lock pin is resting on the side walls of the square tube, yet will allow the elongated round bar to slide down thru the square tube to the retracted or lowered position when the lock pin is oriented diagonally by rotating the elongated round bar.

A retaining ring is also permanently fixed to the elongated round bar to prevent the elongated round bar from being removed from the embodiment. A limit plate is also fixed to the mounting bracket to prevent the elongated round bar from striking the floor of the pickup truck when lowered to the retracted position.

The mounting bracket for the telescoping grab handle may also be utilized to support a cargo anchor for ropes, straps or cargo nets. The mounting bracket for the telescoping grab handle may also be used as a suitable mounting device for an extendable cargo cage, cargo rack or other auto accessories know in the art.

In an alternate embodiment of the telescoping grab handle the square tube mentioned above can be replaced with a triangular tube, however the lock pin would be fixed in a manner to only protrude from one side of the round bar or round tube.

REFERENCE NUMERALS

10 pickup truck
11 cargo box (or cargo bed)
12 right side wall of cargo box
13 floor of cargo box
14 telescoping grab handle
15 tailgate
16 rear bumper
17 left side wall of cargo box
18 front wall of cargo box
19 license plate cavity
20 tire
21 round bar (or round tube)
22 handle bar grip
23 square tube
24 retaining ring
25 limit plate
26 restraining notch
27 lower bevel
28 upper bevel
29 lock pin
30 mounting bracket
31 fastener
32 hole for fastener
33 cargo anchor
34 hinge point for pivoting cargo cage
35 triangular tube

DETAILED DESCRIPTION OF THE PREFERRED EMBODIMENT

Figure 1:
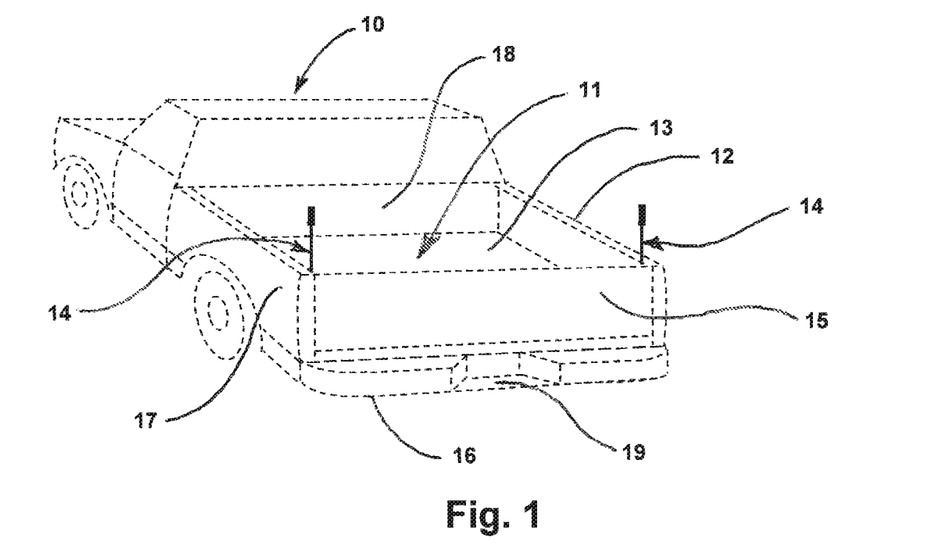
FIG. 1 is a perspective view of a pickup truck as seen from the rear with the tailgate closed showing two embodiments comprising the telescoping grab handle in the extended position as mounted near the rear corners of the cargo box, adjacent the tailgate.
Figure 2:
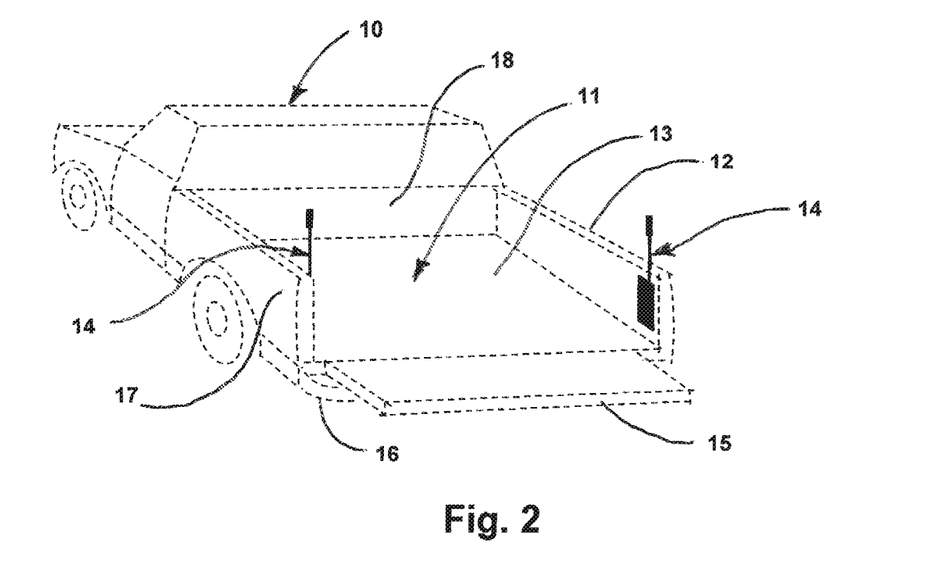
FIG. 2 is a perspective view of a pickup truck as seen from the rear with the tailgate open showing two embodiments comprising the telescoping grab handle in the extended position as mounted near the rear corners of the cargo box, adjacent the tailgate.

FIG. 1 is a perspective view of a typical pickup truck 10 as seen from the rear. Pickup truck 10 is typically manufactured with a cargo box 11 (or cargo bed as it is sometimes called) which comprises the rear portion of pickup truck 10. Cargo box 11 is generally comprised of a floor 13 bounded by a front wall 18, a right side wall 12, a left side wall 17 and an operable tailgate 15 in the rear. Tailgate 15 is pivotally attached at the bottom to floor 13. Tailgate 15 may be opened to a horizontal position as shown in FIG. 2 in order to load or unload cargo or closed to a vertical position as shown in FIG. 1 in order to retain cargo within cargo box 11. In some cases tailgate 15 may be removed in order to load or unload heavy cargo with a forklift.

When tailgate 15 is closed (in the vertical position) as shown in FIG. 1, access into cargo box 11 is typically accomplished by first grabbing the top of tailgate 15 to provide stability and then stepping into license plate cavity 19 located in the middle of rear bumper 16 and thence stepping over tailgate 15 into cargo box 11.

When tailgate 15 has been opened (in the horizontal position) as shown in FIG. 2 to load or unload cargo, most of bumper 16 and all of license plate cavity 19 is obstructed by tailgate 15. Consequently, in order to enter cargo box 11 personnel typically attempt to get a grip on right side wall 12 or left side wall 17 near the rear corners of cargo box 11 and step onto the exposed end of bumper 16 and thence onto tailgate 15. Stepping down off tailgate 15 near the rear corners of cargo box 11 is awkward and hazardous because left side wall 12 or right side wall 17 are not high enough above tailgate 15 to provide suitable stability.

In order to provide assistance to personnel when entering or exiting cargo box 11 when the tailgate 15 is open (or in the horizontal position), two embodiments which comprise telescoping grab handle 14 are shown in the extended position in FIG. 1. One telescoping grab handle 14 is shown at the left rear corner of cargo box 11, adjacent tailgate 15 and one telescoping grab handle 14 is shown at the right rear corner of cargo box 11, adjacent tailgate 15. Only one telescoping grab handle 14 is actually necessary to provide assistance to personnel when entering or exiting cargo box 11. However for convenience, two telescoping grab handles 14 may be placed as shown in FIG. 1 and FIG. 2 to provide assistance when entering or exiting cargo box 11 from the left side or the right side of pickup truck 10.

Figure 3:
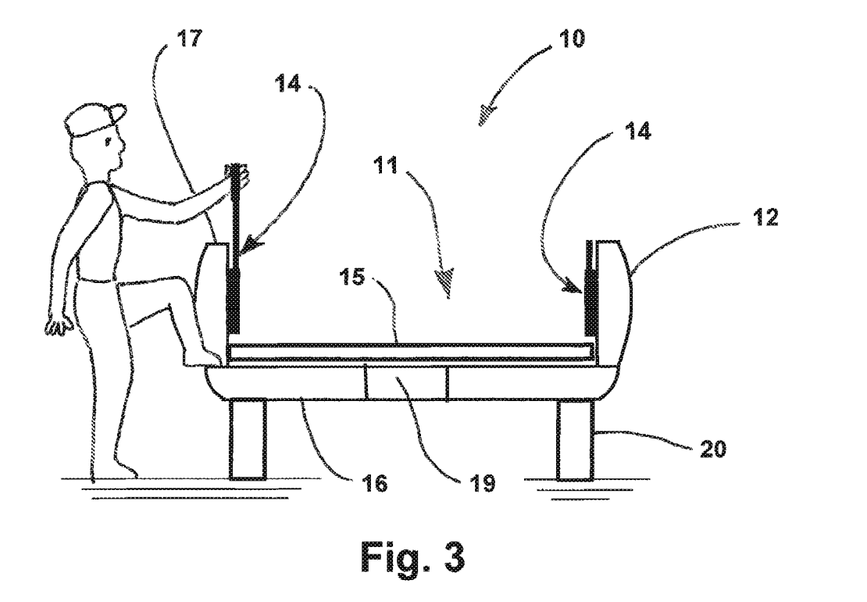
FIG. 3 is an elevation of a pickup truck as seen from the rear showing how personnel would utilize the telescoping grab handle when stepping up into the cargo box.

FIG. 3 is an elevation of pickup 10 as seen from the rear with the tailgate open (or in the horizontal position). One telescoping grab handle 14 is shown in the extended position as mounted on left side wall 17 of cargo box 11. Another telescoping grab handle 14 is shown in the retracted position as mounted on right sidewall 12 of cargo box 11. The person depicted on the left side of cargo box 11 shows how telescoping grab handle 14 would be utilized in order to provide assistance and enhanced stability when stepping up onto the exposed end of bumper 16 and thence onto tailgate 15. Note that there are no obstructions on tailgate 15 to interfere with the loading or unloading of cargo.

Figure 4:
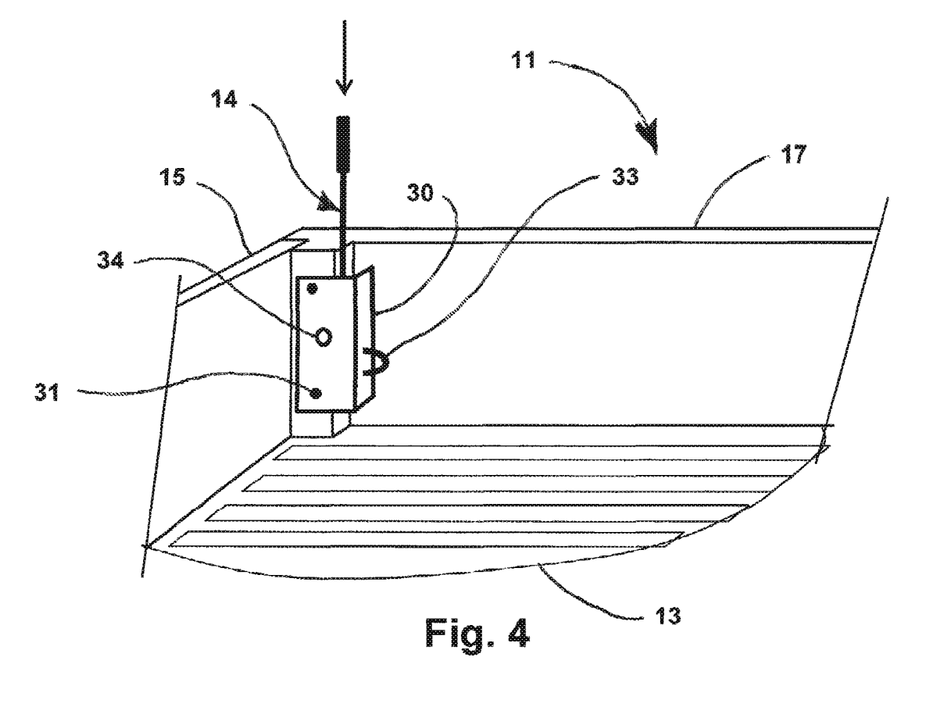
FIG. 4 is an interior perspective of the cargo box showing an exterior view of the embodiment comprising the telescoping grab handle as mounted on the left side wall of the cargo box, adjacent the tailgate.

FIG. 4 is an interior perspective view of cargo box 11 showing how telescoping grab handle 14 would appear in the extended position if mounted on left side wall 17 adjacent tailgate 15. The arrow above telescoping grab handle 14 shows the direction of travel if grab handle 14 were to be retracted. Mounting bracket 30 is configured to fit on the interior surface of left side wall 17 of cargo box 11 and is oriented with the longest dimension in the vertical direction. Mounting bracket 30 supports the internal components of telescoping grab handle 14 and can easily be secured to left side wall 17 with a plurality of fasteners 31 such as bolts, screws or rivets. Mounting bracket 30 also serves to cover the internal components of telescoping grab handle 14 from exterior view and prevents cargo from interfering with the telescoping action of telescoping grab handle 14. Optional cargo anchor 33 is shown in FIG. 4 and could be secured to mounting bracket 30 by welding or other suitable means. Mounting bracket 30 might also be utilized as a suitable mounting device for a cargo net, extendable cargo cage, cargo rack or other auto accessories know in the art. Hinge point 34 is an aperture provided to accommodate a pivoting cargo cage or bed extender.

Although FIG. 4 shows telescoping grab handle 14 as being installed as an aftermarket accessory, it is entirely possible that the internal components of telescoping grab handle 14 could be incorporated directly within left side wall 17 or directly within right side wall 12 by the auto manufacturer without mounting bracket 30.

Figure 5:
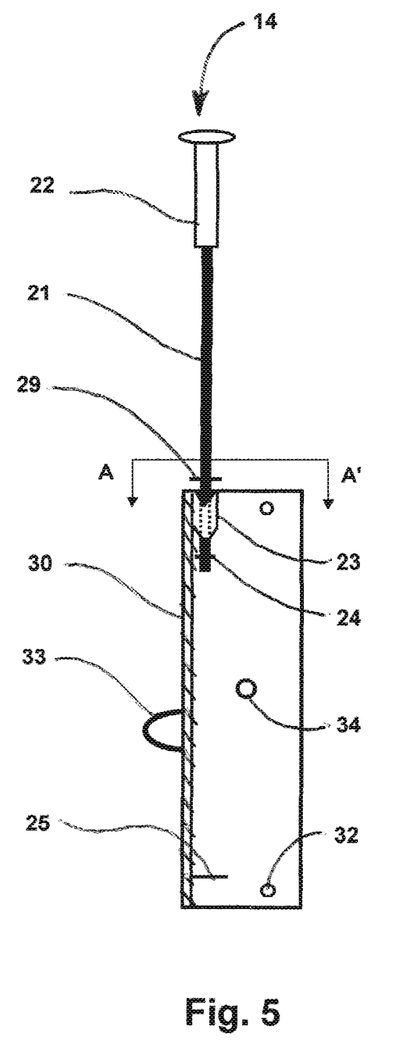
FIG. 5 is a detailed elevation or side view of the embodiment comprising the telescoping grab handle showing the internal components in the extended or raised position.

FIG. 5 is a detailed elevation or side view of telescoping grab handle 14 showing the internal components as seen in the extended position. In order to reduce costs and avoid manufacturing problems, the preferred material for the components of telescoping grab handle 14 would be mild steel, but other alloys, other metals or other materials such as fiber reinforced plastic could be utilized. Fixed components would most likely be welded together, but mechanical fasteners or even adhesives might be utilized.

Figure 6:
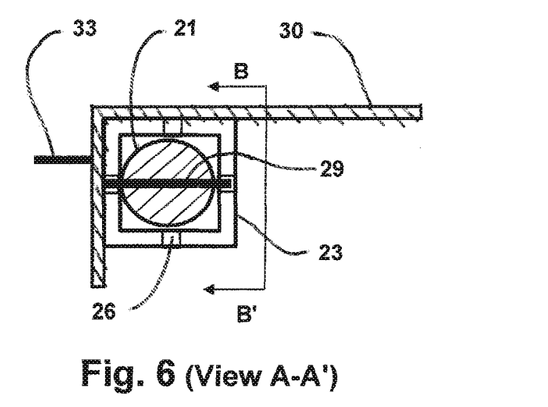
FIG. 6 is a partial cross section of the embodiment comprising the telescoping grab handle when viewed from the top showing the orientation of the lock pin in the extended position.
Figure 8:
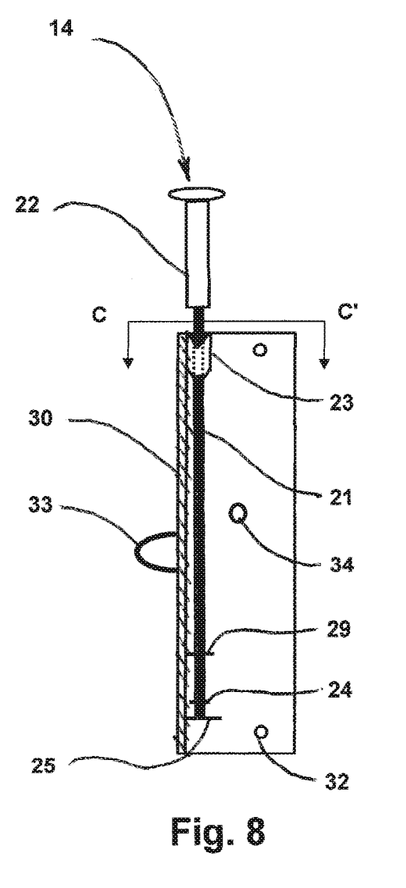
FIG. 8 is a detailed elevation or side view of the embodiment comprising the telescoping grab handle showing the internal components in the retracted or lowered position.

The only operable or moving part of telescoping grab handle 14 is round bar or round tube 21 which is sized so that it may rotate and slide within square tube 23 as shown in FIG. 6. The axis of square tube 23 is oriented vertically and would be welded to the top corner of mounting bracket 30 as shown in FIG. 5. Mounting bracket 30 would preferably be manufactured from steel sheet and would generally take the form of an elongated angle with one short leg and one long leg as shown in FIG. 6. However the size and configuration of mounting bracket 30 may vary depending on the size and configuration of left side wall 17 or right side wall 12 of cargo box 11 found on various pickup trucks 10. Mounting bracket 30 shown in FIG. 5 and FIG. 8 is actually manufactured to fit on left side wall 17 of cargo box 11. However, if a mounting bracket 30 is required for the right side wall 12 of cargo box 11, it can easily be made in similar fashion but "opposite hand". Mounting bracket 30 would include a plurality of holes 32 for fasteners as shown in FIG. 5 and FIG. 8 to be utilized for attachment to left side wall 17.

In addition, mounting bracket 30 may be fitted with an optional cargo anchor 33 as shown in FIG. 5 and FIG. 8. Cargo anchor 33 would preferably be a curved steel bar and would be welded to mounting bracket 30 at a location convenient to attach hooks, ropes or straps utilized to secure cargo. However, other suitable shapes and other means of attachment know in the art may be utilized for cargo anchor 33.

Mounting bracket 30 may also include an attachment or hinge point 34 for a pivoting cargo cage (sometimes called a bed extender).

Limit plate 25 is oriented horizontally and would be welded to mounting bracket 30 near the bottom corner as shown in FIG. 5 and FIG. 8. Limit plate 25 prevents round bar or round tube 21 from striking the floor of cargo box 13 when telescoping grab handle 14 is in the retracted position.

Retaining ring 24 is welded to the lower end of round bar or round tube 21 as shown in FIG. 5 and FIG. 8. The diameter of retaining ring 24 is sized large enough to prevent passage thru square tube 23, thus preventing removal of round bar or round tube 21 from telescoping grab handle 14.

Handle bar grip 22 may be placed on the top of round bar or round tube 21 to improve grip and appearance as shown in FIG. 5 and FIG. 8.

Figure 7:
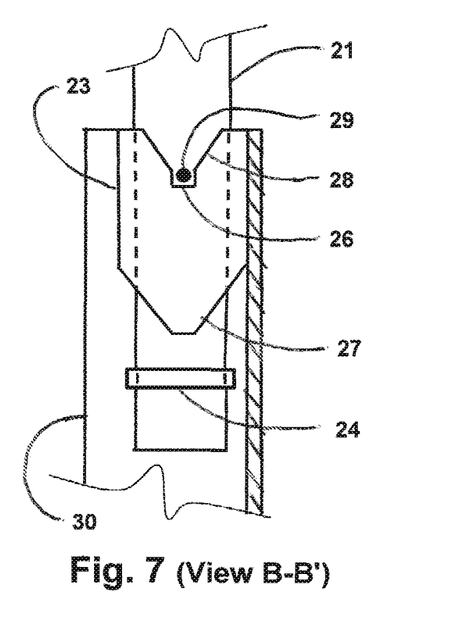
FIG. 7 is a partial cross section of the embodiment comprising the telescoping grab handle when viewed from the side showing the lock pin resting in a restraining notch.
Figure 9:
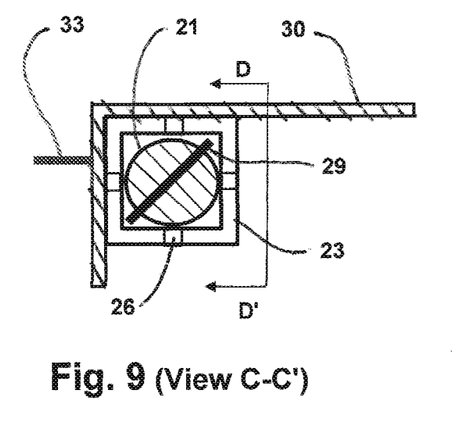
FIG. 9 is a partial cross section of the embodiment comprising the telescoping grab handle when viewed from the top showing the orientation of the lock pin in the retracted position.

A small bar herein called lock pin 29 is placed thru round bar or round tube 21 and protrudes on both sides as shown in FIG. 5 and FIG. 8. The axis of lock pin 29 is perpendicular to the axis of round bar or round tube 21. Lock pin 29 would preferably be manufactured from hardened steel alloy to improve durability and would be tack welded in place to insure it would remain permanently fixed into round bar or round tube 21. Lock pin 29 is sized so that it will fit diagonally within square tube 23 as shown in FIG. 9. Lock pin 29 supports round bar or round tube 21 in the raised or extended position when oriented as shown in FIG. 6. A plurality of restraining notches 26 are placed in the top of square tube 23 as shown in FIG. 6 in order to prevent inadvertent rotation of round bar or round tube 21 while in the extended position. A plurality of upper bevels 28 as shown in FIG. 7 are also provided on top of square tube 23 in order to guide lock pin 29 into restraining notch 26. Corresponding lower bevels 27 are also shown and provide a manner of rotating round bar or round tube 21 when it is lifted so as to guide lock pin 29 to the open corner of square tube 23 to allow the pin to pass up to the top of square tube 23 where it may then be lowered into its locked position as shown in FIG. 7. As long as lock pin 29 is resting in restraining notch 26 as shown in FIG. 7, telescoping grab handle 14 will safely remain in the extended position.

In order to retract telescoping grab handle 14, one merely lifts round bar or round tube 21 enough to raise lock pin 29 out of restraining notch 26 to rotate round bar or round tube 21 until lock pin 29 is oriented diagonally across square tube 23 as shown in FIG. 9, thus allowing round bar or round tube 21 to slide down thru square tube 23 as shown in FIG. 8.

Figure 10:
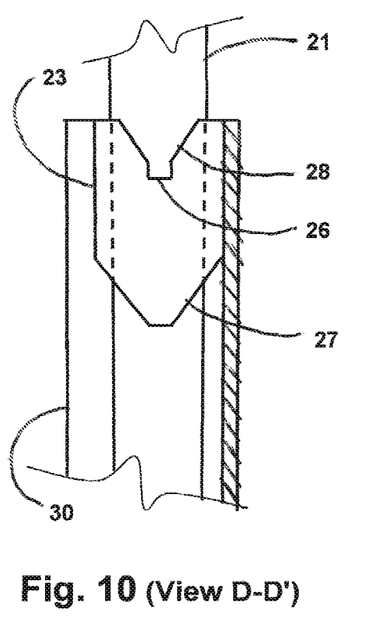
FIG. 10 is a partial cross section of the embodiment comprising the telescoping grab handle when viewed from the side showing the absence of the lock pin in the retracted position.

Reference is next made to FIG. 10 which is a partial cross section of the embodiment comprising the telescoping grab handle when viewed from the side showing the absence of the lock pin in the retracted position. The plurality of restraining notches 26 are shown in the top of square tube 23 as shown in FIG. 7 but without the positioning of the guide lock pin 29. In this view, round bar or round tube 21 is in a refracted position as shown in FIG. 8. The plurality of upper bevels 28 are shown in FIG. 10 and are, once again, provided on top of square tube 23 in order to guide lock pin 29 into restraining notch 26.

Figure 11:
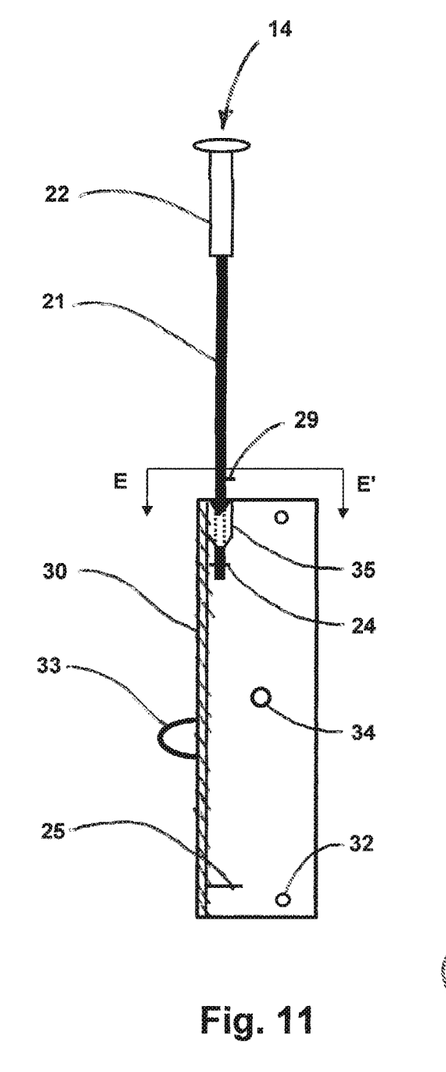
FIG. 11 is a detailed elevation or side view of an alternate embodiment comprising the telescoping grab handle showing the internal components in the extended or raised position.

FIG. 11 is a detailed elevation or side view of telescoping grab handle 14 showing an alternate embodiment of internal components as seen in the extended position. Note that triangular tube 35 shown in FIG. 11 has replaced square tube 23 as previously shown in FIG. 5. All other components shown in FIG. 11 are the same as shown in FIG. 5 except for lock pin 29 which protrudes from only one side of round bar or round tube 21.

Figure 12:
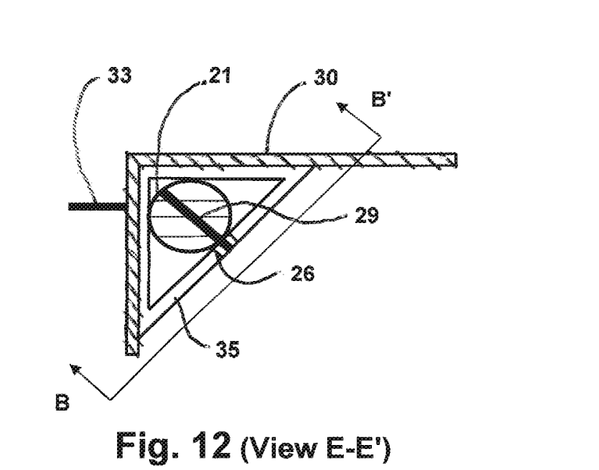
FIG. 12 is a partial cross section of an alternate embodiment comprising the telescoping grab handle when viewed from the top showing the orientation of the lock pin in the extended position.

FIG. 12 is a partial cross section of an alternate embodiment of telescoping grab handle 14 when viewed from the top showing the orientation of lock pin 29 in the extended position. Note that triangular tube 35 shown in FIG. 12 has replaced square tube 23 shown in FIG. 6. Other components in FIG. 12 are the same as shown in FIG. 6 except for lock pin 29 which protrudes from only one side of round bar or round tube 21.

Figure 13:
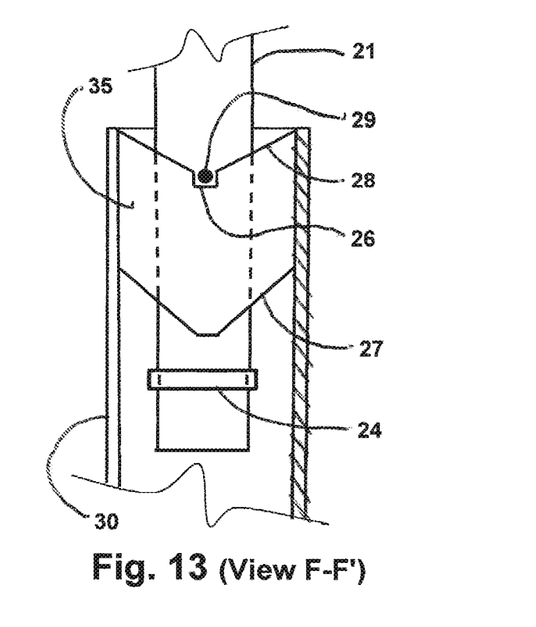
FIG. 13 is a partial cross section of an alternate embodiment comprising the telescoping grab handle when viewed from the side showing the lock pin resting in a restraining notch.

FIG. 13 is a partial cross section of an alternate embodiment of telescoping grab handle 14 when viewed from the side showing lock pin 29 resting in a restraining notch 26. Note that triangular tube 35 shown in FIG. 13 has replaced square tube 23 shown in FIG. 7. All other components shown in FIG. 13 are the same as shown in FIG. 7.

Figure 14:
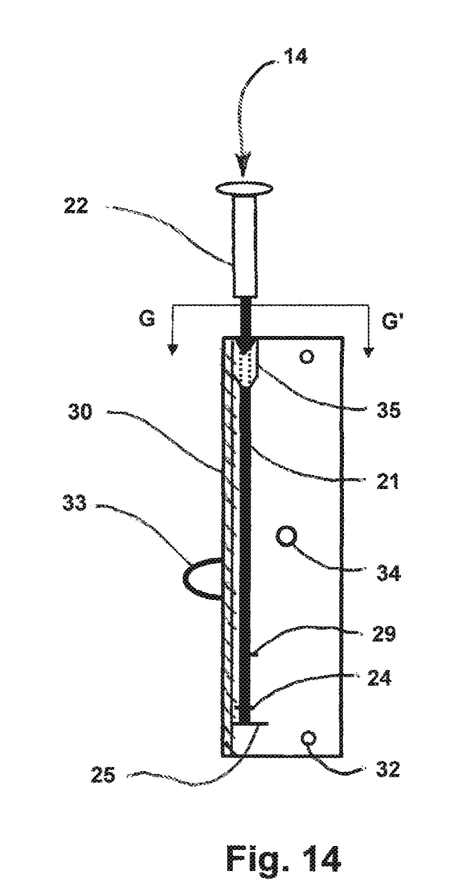
FIG. 14 is a detailed elevation or side view of an alternate embodiment comprising the telescoping grab handle showing the internal components in the retracted or lowered position.

FIG. 14 is a detailed elevation or side view of telescoping grab handle 14 showing an alternate embodiment of internal components as seen in the retracted position. Note that triangular tube 35 shown in FIG. 14 has replaced square tube 23 as previously shown in FIG. 8. All other components shown in FIG. 14 are the same as shown in FIG. 8 except for lock pin 29 which protrudes from only one side of round bar or round tube 21.

Figure 15:
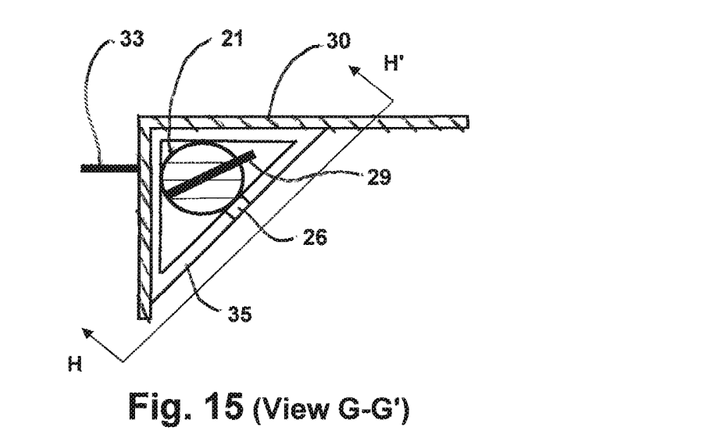
FIG. 15 is a partial cross section of an alternate embodiment comprising the telescoping grab handle when viewed from the top showing the orientation of the lock pin in the retracted position.

FIG. 15 is a partial cross section of an alternate embodiment of telescoping grab handle 14 when viewed from the top showing the orientation of lock pin 29 in the retracted position. Note that triangular tube 35 shown in FIG. 15 has replaced square tube 23 shown in FIG. 9. Other components in FIG. 15 are the same as shown in FIG. 9 except for lock pin 29 which protrudes from only one side of round bar or round tube 21.

Figure 16:
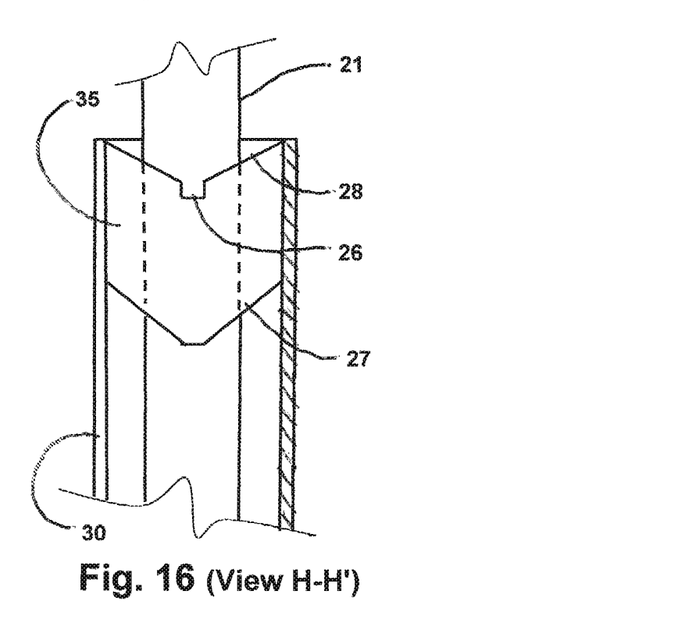
FIG. 16 is a partial cross section of an alternate embodiment comprising the telescoping grab handle when viewed from the side showing the absence of the lock pin in the retracted position.

FIG. 16 is a partial cross section of an alternate embodiment of telescoping grab handle 14 when viewed from the side showing the absence of lock pin 29 in the retracted position. Note that triangular tube 35 shown in FIG. 16 has replaced square tube 23 shown in FIG. 10. All other components shown in FIG. 16 are the same as shown in FIG. 10.

Although the present invention has been described in terms of the foregoing preferred and alternate embodiments, this description has been provided by way of explanation only, and is not intended to be construed as a limitation of the invention. Those skilled in the art will recognize modifications in the present invention that might accommodate specific pickup trucks and specific cargo bed configurations. Such modifications as to structure, method of operation, and even the specific arrangement of components, where such modifications are coincidental to the specific truck design or cargo bed structure being utilized, do not necessarily depart from the spirit and scope of the invention. Those skilled in the art will recognize that the structures of the present invention may be implemented by fitting the telescoping grab handle within the side wall of the cargo box or on the side wall surface of the cargo box. One of the key structural features is the telescoping member and lock pin action which requires only one moving part and may be achieved with a square tubular collar or a triangular tubular collar as described herein. In addition to supporting the internal components, the mounting bracket protects the internal components from interference with stowed or loaded cargo. The mounting bracket may also serve as a support for various auto accessories such as a cargo anchor, cargo rack or pivoting cargo cage.

I claim:

1. A grab handle device for providing assistance and enhanced stability to a person when entering or exiting a cargo box on a pickup truck, the grab handle device comprising:
    a mounting bracket positioned in association with a sidewall of the cargo box of the pickup truck, the mounting bracket comprising a tubular collar member; and
    a movable grab bar slidingly positioned within the tubular collar member of the mounting bracket, the grab bar oriented generally upright with respect to the sidewall of the cargo box, the grab bar comprising a first end extending above the tubular collar member and a second end extending below the tubular collar member, the grab bar movable between a first position with the first end lowered and proximal to the tubular collar member and a second position with the first end elevated and distal to the tubular collar member.

2. The grab handle device of claim 1 wherein the tubular collar member comprises a holding mechanism for securing the grab bar in the elevated second position with the first end of the grab bar extending above a top edge of the sidewall of the cargo box.

3. The grab handle device of claim 2 wherein the holding mechanism comprises a retention notch formed on a top edge of the tubular collar member and the grab bar further comprises a lock pin positioned along a length of the second end of the grab bar, the lock pin positioned so as to alternately engage with and disengage from the retention notch.

4. The grab handle device of claim 3 wherein the tubular collar member comprises a square tube cross section having internal walls forming internal corners and wherein the lock pin is sized to pass through the tubular collar member when rotationally oriented to align with the internal corners and not to pass through the tubular collar member when rotationally oriented out of alignment with the internal corners.

5. The grab handle device of claim 4 wherein the at least one retention notch is sized to receive and retain the lock pin after the lock pin has passed through the tubular collar member and oriented out of alignment with the internal corners of the tubular collar member.

6. The grab handle device of claim 3 wherein the tubular collar member comprises a right triangular tube cross section having internal walls forming a right angle internal corner and two acute angle internal corners and wherein the lock pin is sized to pass through the tubular collar member when rotationally oriented out of alignment with the right angle internal corner and not to pass through the tubular collar member when rotationally oriented to align opposite the right angle internal corner.

7. The grab handle device of claim 6 wherein the at least one retention notch is sized to receive and retain the lock pin after the lock pin has passed through the tubular collar member and oriented out of alignment with the internal corners of the tubular collar member.

8. The grab handle device of claim 3 wherein the tubular collar member comprises an upper edge, the upper edge beveled towards the at least one retention notch to facilitate the positioning of the lock pin into the retention notch.

9. The grab handle device of claim 1 wherein the mounting bracket is positioned within the structure of the side wall of the cargo box of the pickup truck.

10. The grab handle device of claim 1 wherein the mounting bracket is positioned on an inside-the-bed surface of the side wall of the cargo box of the pickup truck.

11. The grab handle device of claim 10 further comprising at least one mounting bolt for securing the mounting bracket to the side wall of the cargo box.

12. The grab handle device of claim 10 wherein the mounting bracket further comprises a cargo anchor.

13. The grab handle device of claim 1 further comprising a limit plate, the limit plate positioned on the mounting bracket adjacent a lower edge of the sidewall of the cargo box below the tubular collar member and configured to contact the second end of the movable grab bar when the grab bar is in the lowered first position.

14. The grab handle device of claim 1 further comprising a handle bar grip positioned on the first end of the movable grab bar.

15. The grab handle device of claim 10 wherein the mounting bracket comprises a length of metal angle plate, the length of metal angle plate comprising a first plate section attachable to the sidewall of the cargo box and a second plate section extending orthogonally away from the first plate section, the tubular collar member positioned at an interior corner formed at a junction between the first and second plate sections.

16. A grab handle device for providing assistance and enhanced stability to a person when entering or exiting a cargo box on a pickup truck, the grab handle device comprising:
    an extendable grab bar, the grab bar oriented generally upright with respect to a sidewall of the cargo box, the grab bar comprising a first end initially positioned adjacent a top edge of the sidewall of the cargo box and a second end initially positioned adjacent a lower edge of the sidewall of the cargo box, the grab bar comprising a lock pin positioned along a length of the second end of the grab bar;
    a mounting bracket positioned in association with the sidewall of the cargo box of the pickup truck; and
    a tubular collar member, the extendable grab bar slidingly positioned within the tubular collar member, the tubular collar member comprising:
        a top edge defining at least one retention notch, the lock pin of the extendable grab bar positioned so as to alternately engage with and disengage from the retention notch;
        a section of triangular tube having a right triangle tubular cross section having internal walls forming a right angle internal corner and two acute angle internal corners and wherein the lock pin is sized to pass through the tubular collar member when rotationally oriented out of opposing alignment with the right angle internal corner and not to pass through the tubular collar member when rotationally oriented into opposing alignment with the right angle internal corner;
    wherein the grab bar may be extended from a lowered position with the lock pin below the tubular collar member to an elevated, releasably locked position with the lock pin above the tubular collar member resting under the force of gravity within the retention notch.

17. The grab handle device of claim 16 further comprising a limit plate, the limit plate positioned on the mounting bracket adjacent a lower edge of the sidewall of the cargo box below the tubular collar member and configured to contact the second end of the extendable grab bar when the grab bar is in a lowered position.

18. The grab handle device of claim 16 further comprising a handle bar grip positioned on the first end of the extendable grab bar.

19. The grab handle device of claim 16 wherein the mounting bracket comprises a length of metal angle plate, the length of metal angle plate comprising a first plate section attachable to the sidewall of the cargo box and a second plate section extending orthogonally away from the first plate section, the tubular collar member positioned at an interior corner formed at a junction between the first and second plate sections.

* * * * *